(No Model.)

E. J. VAUZELLE.
VALVE FOR PNEUMATIC TIRES.

No. 510,215. Patented Dec. 5, 1893.

WITNESSES:
George Baumann
S. C. Cannon

INVENTOR
Emile Joseph Vauzelle
BY
Howson & Howson
his ATTORNEYS.

United States Patent Office.

EMILE JOSEPH VAUZELLE, OF PARIS, FRANCE.

VALVE FOR PNEUMATIC TIRES.

SPECIFICATION forming part of Letters Patent No. 510,215, dated December 5, 1893.

Application filed September 15, 1893. Serial No. 485,586. (No model.) Patented in France April 14, 1893, No. 216,153.

*To all whom it may concern:*

Be it known that I, EMILE JOSEPH VAUZELLE, builder, a citizen of the Republic of France, residing in Paris, France, have invented an Improved Valve for Pneumatic Tires, (for which I have obtained a French patent, dated April 14, 1893, No. 216,153,) of which the following is a specification.

My invention relates to a valve for use in inflating the air chambers of pneumatic tires for wheels of velocipedes and other vehicles, the said valve being characterized by the fact that neither a spring nor any fragile part is used in its construction.

This valve consists substantially of a tube adapted to be lengthened or shortened at will and acting in combination with a cone connected to a ball by means of a rod traversing the entire length of the said valve. In order that its construction and mode of action may be properly understood I will proceed to describe the valve with reference to the accompanying drawings in which it is represented by way of example.

Figure 1:
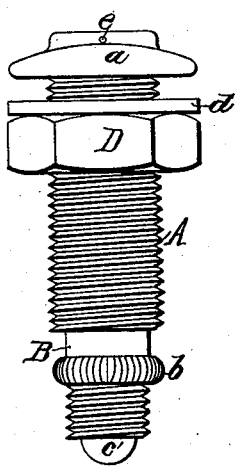
Figure 2:
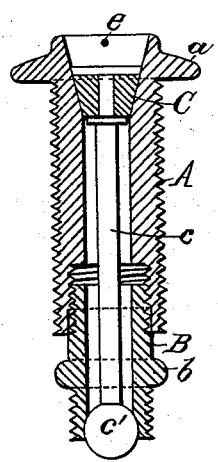
Figure 3:
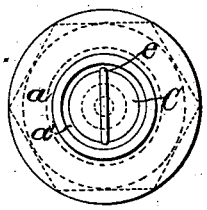

Figure 1 is an elevation of the valve provided with a washer and nut designed for fixing it upon the air chamber. Fig. 2 is a section through the axis showing the several parts constituting the valve. Fig. 3 is a plan.

The body A of the valve is screw threaded the whole of its length. It has a conical flange $a$, a central cylindrical hole terminating at the flanged end in a conical cavity $a'$ and at the other end in an interiorly screw threaded recess of larger diameter. Into this recess is screwed a socket B having a milled collar $b$. In the conical cavity $a'$ is arranged the cone C made of compressible material and connected by a rod $c$ to a ball $c'$ held in a spherical cavity provided in the lower part of the socket B. The whole of the valve thus constituted is fixed to the air chamber by means of the nut D exerting pressure upon a washer $d$ for insuring the tightness of the joint.

The introduction of air into the pneumatic tire is effected by means of a pump. The union of the latter is screwed upon the socket B which is at the same time screwed into the body A thus uncovering the air admission orifice previously closed by the ball $c'$. The cone C being released can then rise under the pressure of the air coming from the pump set in operation and close again automatically. Its movement is limited by a pin $e$ traversing the head of the valve body. When the chamber has been inflated with air to the desired extent it is sufficient to unscrew the union of the pump. This operation causes at the same time the unscrewing of the socket B which, bearing against the ball $c'$, causes the cone C to be carried away through the intervention of the latter and the rod $c$ in such a manner that this cone, bearing upon its conical seat $a'$, effects the hermetic closing of the valve.

It will be understood that the above described valve may be made of any desired materials, forms and dimensions, according to the use for which it is designed.

What I claim is—

1. In a valve for pneumatic tires the combination of a cone C with a ball $c'$ by which the cone is forced upon its seat $a'$ when the said ball is moved outward by means of a movable part or socket B, and released on the ball being liberated again, substantially as herein described with reference to the drawings.

2. In a valve for pneumatic tires the combination with its body A of a movable part or socket B which during the connection of an air compression pump to the same liberates the ball $c'$ and the cone C, and which during the disconnection of the said pump forces the ball outward and the cone upon its seat, substantially as herein described with reference to the drawings.

In testimony whereof I have signed my name to this specification in the presence of two subscribing witnesses.

EMILE JOSEPH VAUZELLE.

Witnesses:
 PAUL CHARLES ERNEND GARNAND,
 LEVI FRANCKEN.